United States Patent
Budhiraja et al.

(10) Patent No.: US 10,776,357 B2
(45) Date of Patent: Sep. 15, 2020

(54) SYSTEM AND METHOD OF DATA JOIN AND METADATA CONFIGURATION

(71) Applicant: Infosys Limited, Bangalore (IN)

(72) Inventors: Navin Budhiraja, Palo Alto, CA (US); Sudipto Shankar Dasgupta, Bangalore (IN); Sameer Mahadeo Kolhatkar, Pune (IN); Mayoor Rao, Mangalore (IN); Arulkumar Gopalan, Namakkal (IN)

(73) Assignee: Infosys Limited, Bangalore (IN)

( * ) Notice: Subject to any disclaimer, the term of this patent is extended or adjusted under 35 U.S.C. 154(b) by 249 days.

(21) Appl. No.: 15/247,659

(22) Filed: Aug. 25, 2016

(65) Prior Publication Data

US 2017/0060950 A1    Mar. 2, 2017

(30) Foreign Application Priority Data

Aug. 26, 2015   (IN) .......................... 4479/CHE/2015

(51) Int. Cl.
*G06F 16/2453*   (2019.01)
*G06F 16/2455*   (2019.01)

(52) U.S. Cl.
CPC .... *G06F 16/24544* (2019.01); *G06F 16/2456* (2019.01)

(58) Field of Classification Search
CPC ......... G06F 17/30466; G06F 17/30498; G06F 17/30463; G06F 17/30545; G06F 17/30592
USPC ........................................................ 707/714
See application file for complete search history.

(56) References Cited

U.S. PATENT DOCUMENTS

| | | |
|---|---|---|
| 6,449,620 B1 | 9/2002 | Draper et al. |
| 7,146,356 B2 | 12/2006 | Choi et al. |
| 7,849,048 B2 | 12/2010 | Langseth et al. |
| 8,209,352 B2 | 6/2012 | Murthy et al. |
| 2004/0044659 A1 | 3/2004 | Judd et al. |
| 2006/0007466 A1* | 1/2006 | Ben-Yehuda ........... G06F 16/88 358/1.13 |

(Continued)

OTHER PUBLICATIONS

Sint et al., "Combining Unstructured, Fully Structured and Semi-Structured Information in Semantic Wikis," Siemens AG (Siemens IT Solutions and Services) Werner von Siemens-Platz 1, 5020 Salzburg Austria, *Fourth Workshop on Semantic Wikis—The Semantic Wiki Web 6th European Semantic Web Conference* Hersonissos Crete, Greece, Jun. 2009, 15 pages.

(Continued)

*Primary Examiner* — Hosain T Alam
*Assistant Examiner* — Nicholas E Allen
(74) *Attorney, Agent, or Firm* — Klarquist Sparkman, LLP

(57) ABSTRACT

A method and system of a data join includes capture of metadata information associated with one of semi-structured data and unstructured data. A flattened structure for one of the semi-structured data and the unstructured data is defined, and an entity is extracted from the unstructured data. Further, one of the semi-structured data and an entity extracted unstructured data are flattened based on the flattened structure, and flattened semi-structured data and flattened entity extracted unstructured data with relational data are joined.

16 Claims, 8 Drawing Sheets

(56) References Cited

U.S. PATENT DOCUMENTS

| | | | | |
|---|---|---|---|---|
| 2010/0145917 A1* | 6/2010 | Bone | ............... | G06F 16/122 |
| | | | | 707/694 |
| 2012/0254143 A1* | 10/2012 | Varma | ............... | G06F 17/2785 |
| | | | | 707/706 |
| 2013/0144889 A1* | 6/2013 | Gupta | ............... | G06F 16/334 |
| | | | | 707/749 |
| 2014/0207802 A1* | 7/2014 | Raghavan | ............... | G06F 16/3328 |
| | | | | 707/749 |
| 2014/0279838 A1* | 9/2014 | Tsirogiannis | ............... | G06F 16/211 |
| | | | | 707/603 |
| 2014/0280194 A1* | 9/2014 | Bouton | ............... | G06F 16/31 |
| | | | | 707/741 |
| 2014/0344211 A1* | 11/2014 | Allan | ............... | G06F 17/30563 |
| | | | | 707/602 |
| 2015/0234869 A1* | 8/2015 | Chan | ............... | G06F 17/30312 |
| | | | | 707/603 |
| 2016/0092476 A1* | 3/2016 | Stojanovic | ............... | G06F 16/211 |
| | | | | 707/805 |
| 2016/0092557 A1* | 3/2016 | Stojanovic | ............... | G06F 17/30554 |
| | | | | 707/723 |
| 2016/0171050 A1* | 6/2016 | Das | ............... | G06F 17/30976 |
| | | | | 707/714 |

OTHER PUBLICATIONS

Molina et al, "The TSIMMIS Approach to Mediation: Data Models and Languages," *Journal of Intelligent Information Systems*, Mar. 1997, vol. 8, Issue 2, pp. 117-132.

\* cited by examiner

SYSTEM AND METHOD OF DATA JOIN AND METADATA CONFIGURATION

FIELD

The present disclosure relates to methods and systems for data joining and meta data configuration.

BACKGROUND

Significant information in enterprises may currently be in semi-structured data in the form of JSON, XML etc. For interpretation of data and joining the data with structured relational data, the semi-structured data may need to be flattened. With flattening of the data, the metadata and schema information may need to be redefined. For example, XSD for XML would no longer be valid in the flattened XML; similarly JSON metadata may not be valid for the flattened JSON data.

Existing methods of data joins were developed assuming a single program being executed on a single processor. These methods were not developed with massive parallelization as an objective, and software tools based on these methods are not adequate to fully exploit the performance of the new parallel distributed processing techniques.

Current mechanisms do not allow parallelization of data and massive participation of users that may lead to various forms of data that may need to be integrated in order to be understood.

SUMMARY

Disclosed are a method, an apparatus and/or a system for data joining and metadata configuration.

In one aspect, a method of a data join comprises capture of a metadata information associated with one of a semi-structured data and an unstructured data. A flattened structure for one of the semi-structured data and the unstructured data is defined and an entity is extracted from the unstructured data. Further, one of the semi-structured data and an entity extracted unstructured data are flattened based on the flattened structure and flattened semi-structured data and flattened entity extracted unstructured data with relational data are joined.

In another aspect, a system of a data join comprises a computer network, one or more processors and one or more memory units. The one or more memory units are operatively coupled to the one or more processors over the computer network. The one or more memory units include instructions stored thereon that, when executed by the one or more processors, cause the one or more processors to capture a meta data information associated with one of a semi-structured data and an unstructured data and define a flattened structure for one of the semi-structured data and the unstructured data. Further, an entity is extracted from the unstructured data and one of the semi-structured data and an entity extracted unstructured data are flattened based on the flattened structure. The flattened semi-structured data and flattened entity extracted unstructured data are joined with relational data.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of data join and metadata configuration. Although the present embodiments have been described with reference to specific example embodiments, it will be evident that various modifications and changes may be made to these embodiments without departing from the broader spirit and scope of the various embodiments.

Figure 3:
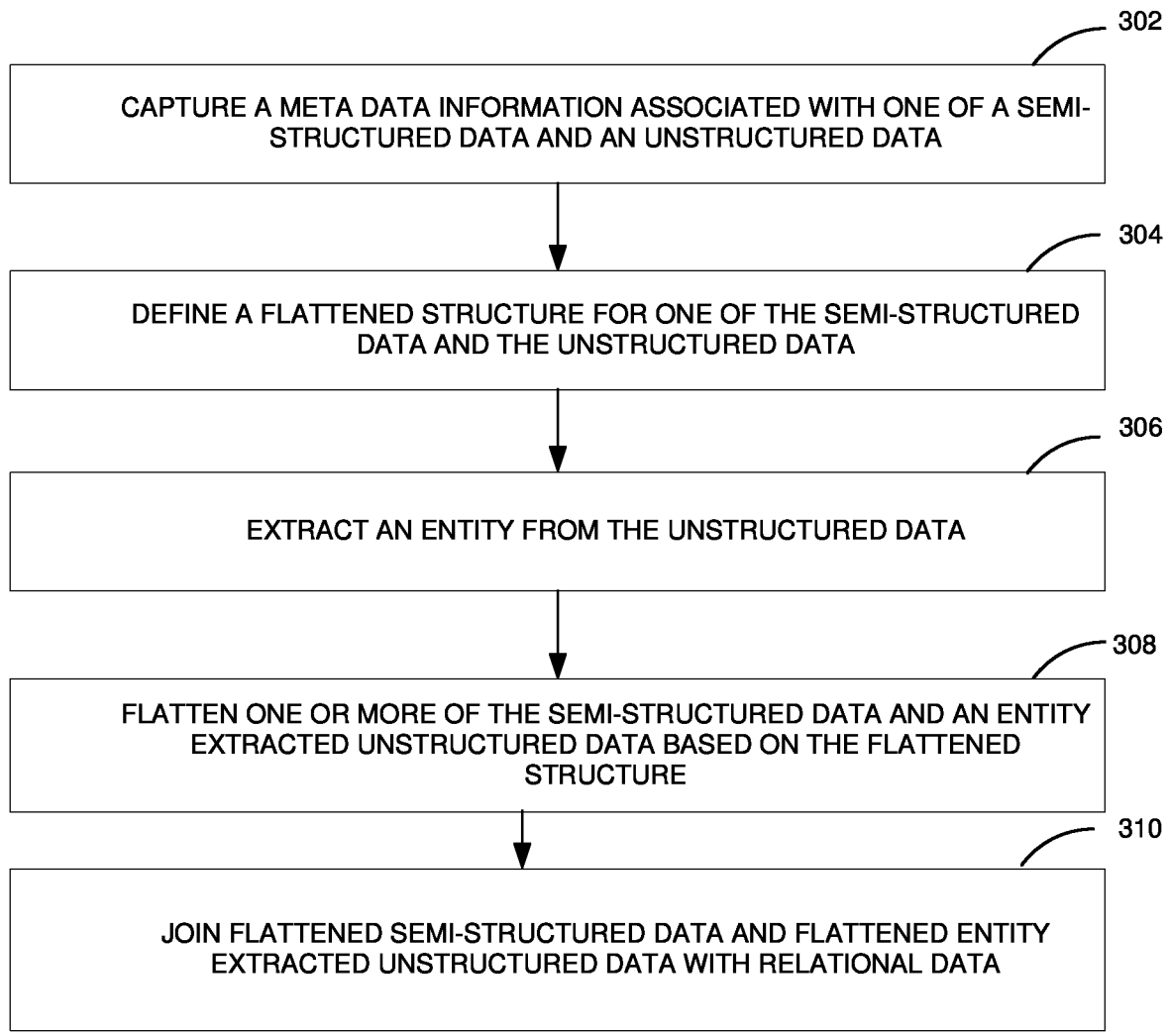
FIG. 3 is a process flow diagram detailing the operations of a method of a data join, according to one or more embodiments.

FIG. 3 is a process flow diagram detailing the operations of a method of a data join, according to one or more embodiments.

In one or more embodiments, a method of a data join may include capture of a metadata information associated with one of a semi-structured data and an unstructured data 302. A flattened structure for one of the semi-structured data and the unstructured data may be defined 304 and an entity is extracted from the unstructured data 306. Further, one of the semi-structured data and an entity extracted unstructured data may be flattened based on the flattened structure 308. Finally, the flattened semi-structured data and flattened entity extracted unstructured data with relational data may be joined 310.

In one or more embodiments, a method of a data join and a system for capturing, extracting, and flattening predefined metadata information from data sources may be defined. The metadata information may be captured through a processor, and is associated with at least one kind of data such as semi-structured data, unstructured data, relational data. The association may be further defined, through a processor to create a flattened structure and join data forms into a single structure.

Figure 2:
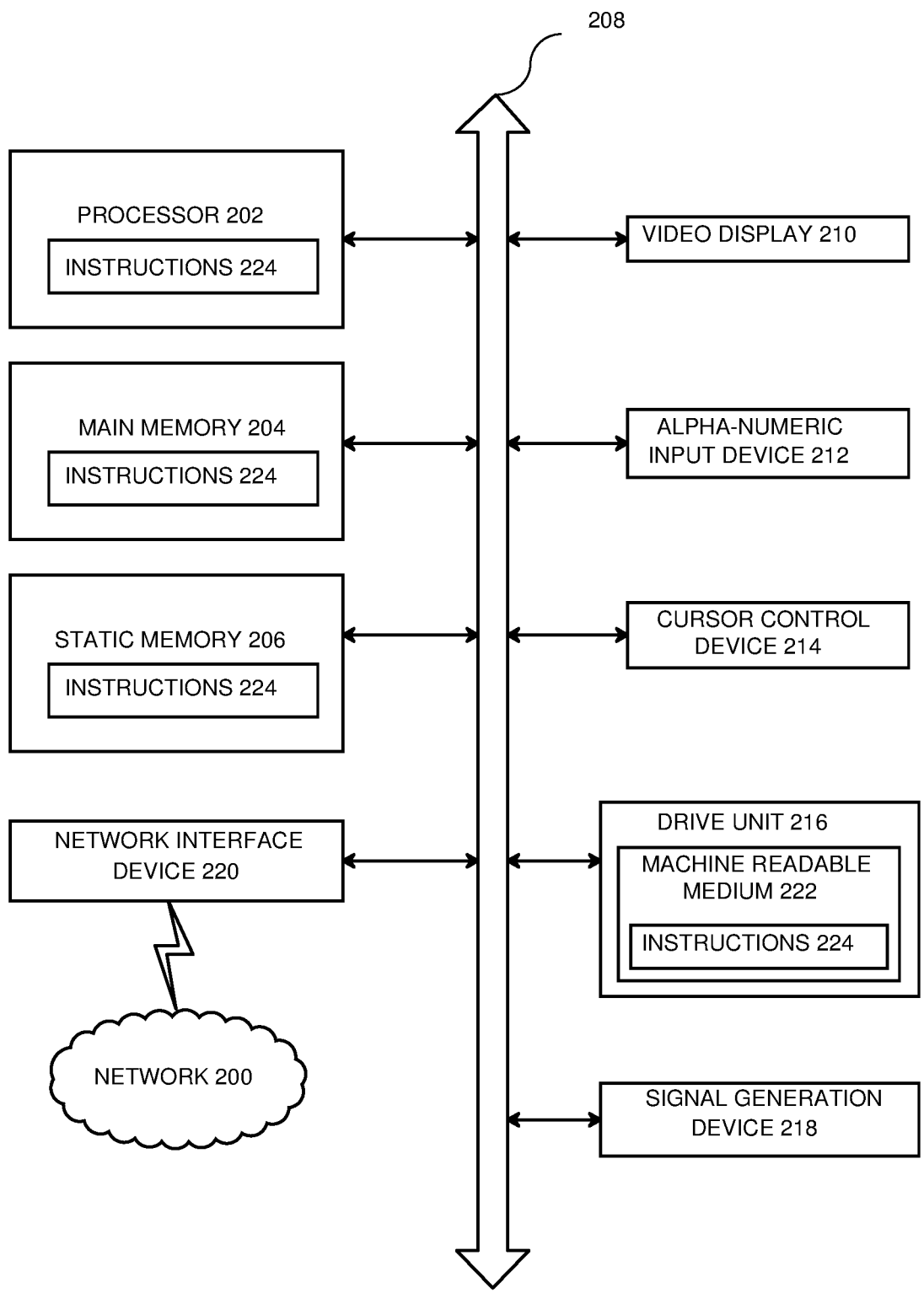
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 4:
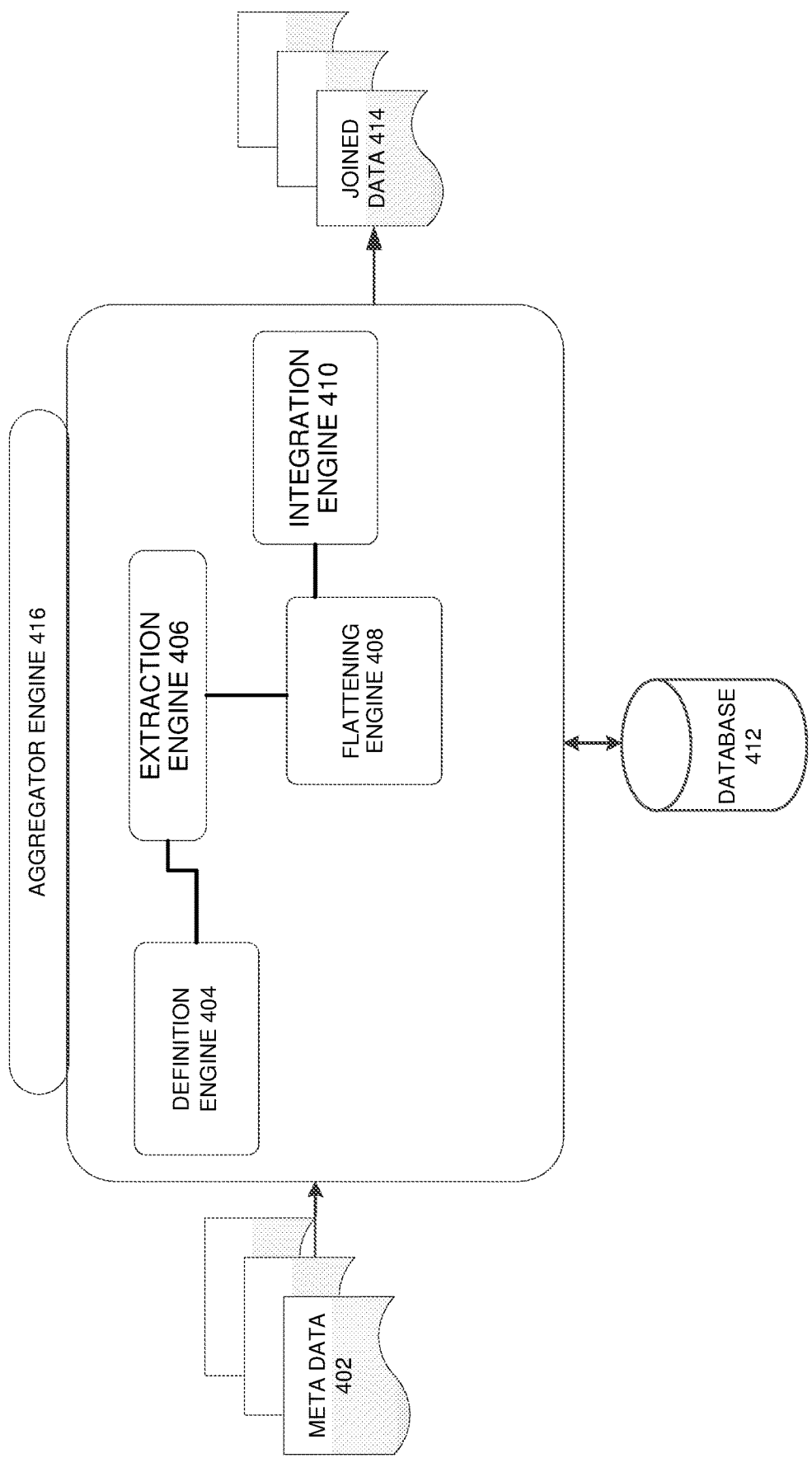
FIG. 4 is a diagrammatic representation of capturing and joining data, according to one embodiment.

FIG. 4 is a diagrammatic representation of capturing and joining data, according to one embodiment. An aggregator engine 416 may receive metadata 402 as input. The aggregator engine may include a definition engine 404, extraction engine 406, flattening engine 408 and integration engine 410. The aggregator engine 416 may be communicatively coupled to a database 412. Metadata 402 may be captured. The metadata 402 may be associated with one or more of a semi-structured data and unstructured data. A flattened structure may be defined for the semi-structured and/or unstructured data through the definition engine 404. The definition engine 404 may have access to flattened structure templates. An entity may be extracted from the unstructured data through the extraction engine 406.

Further, one of the semi-structured data and the entity extracted unstructured data may be flattened based on the flattened structure through the flattening engine 408. The flattened semi-structured data and flattened entity extracted unstructured data may be joined with relational data through the integration engine. Thus, joined data 414 may be obtained from the aggregator engine 416.

Figure 5:
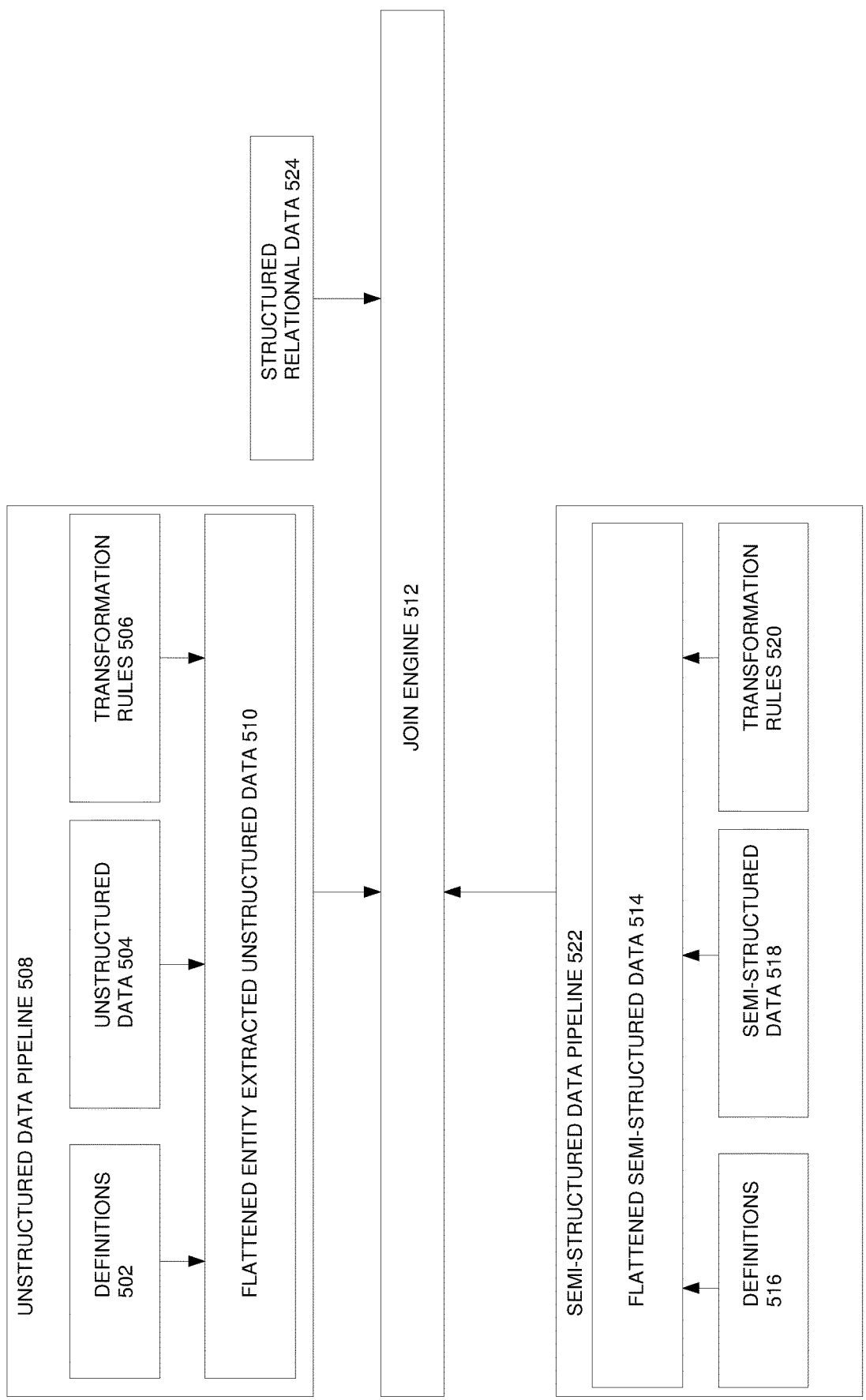
FIG. 5 is a diagrammatic representation of capturing, defining, extracting and joining data, according to one embodiment.

FIG. 5 is a diagrammatic representation of capturing, defining, extracting and joining data, according to one or more embodiments.

In one or more embodiments, a layer of abstraction may be created over a query language. Further, the query language may capture metadata information, through a processor and define a flattened structure. Still further, the query language may extract an entity through a processor based on the flattened structure and joining the flattened semi-structured data and flattened entity extracted unstructured data with relational data.

In one or more embodiments, an unstructured data pipeline 508, semi-structured data pipeline 522 and structured relational data 524 may be directed to a join engine 512. The unstructured data pipeline 508 may include definitions 502, unstructured data 504 and transformation rules 506 that may be flattened into a flattened entity extracted unstructured data 510.

Figure 6:
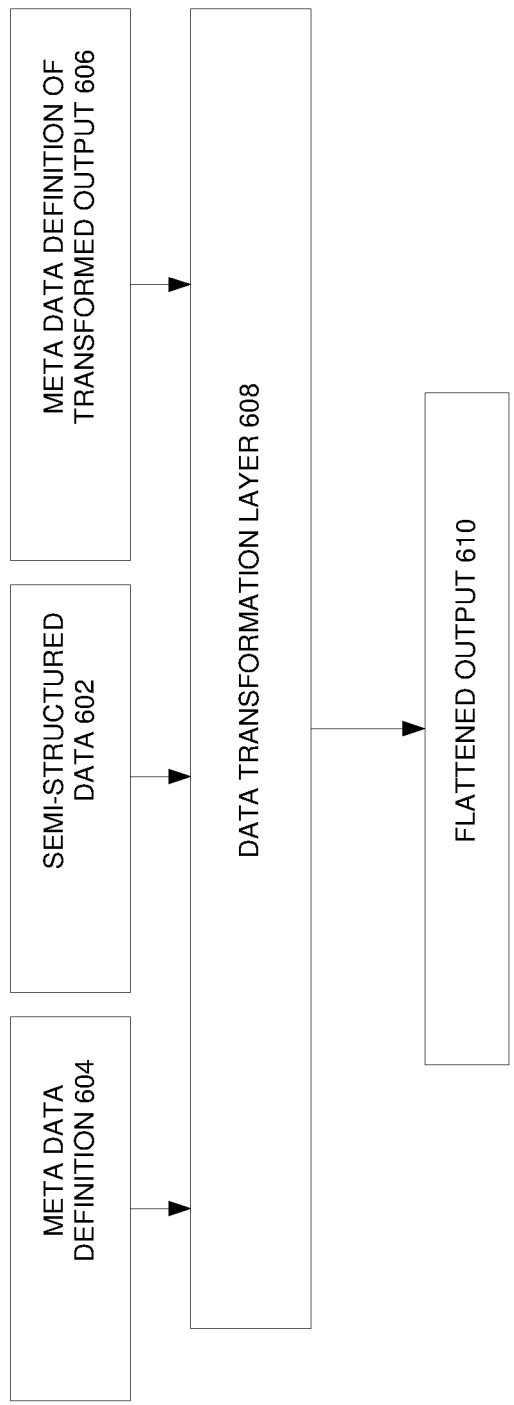
FIG. 6 is a data flow representation of capturing, defining, extracting and joining data, according to one embodiment.

FIG. 6 is a data flow representation of capturing, defining, extracting and joining data, according to one embodiment. A data transformation layer 608 may receive one of a semi-structured data input 602, metadata definition 604 of input data, and metadata definition of transformed output 606 to generate a flattened output 610.

Figure 1:
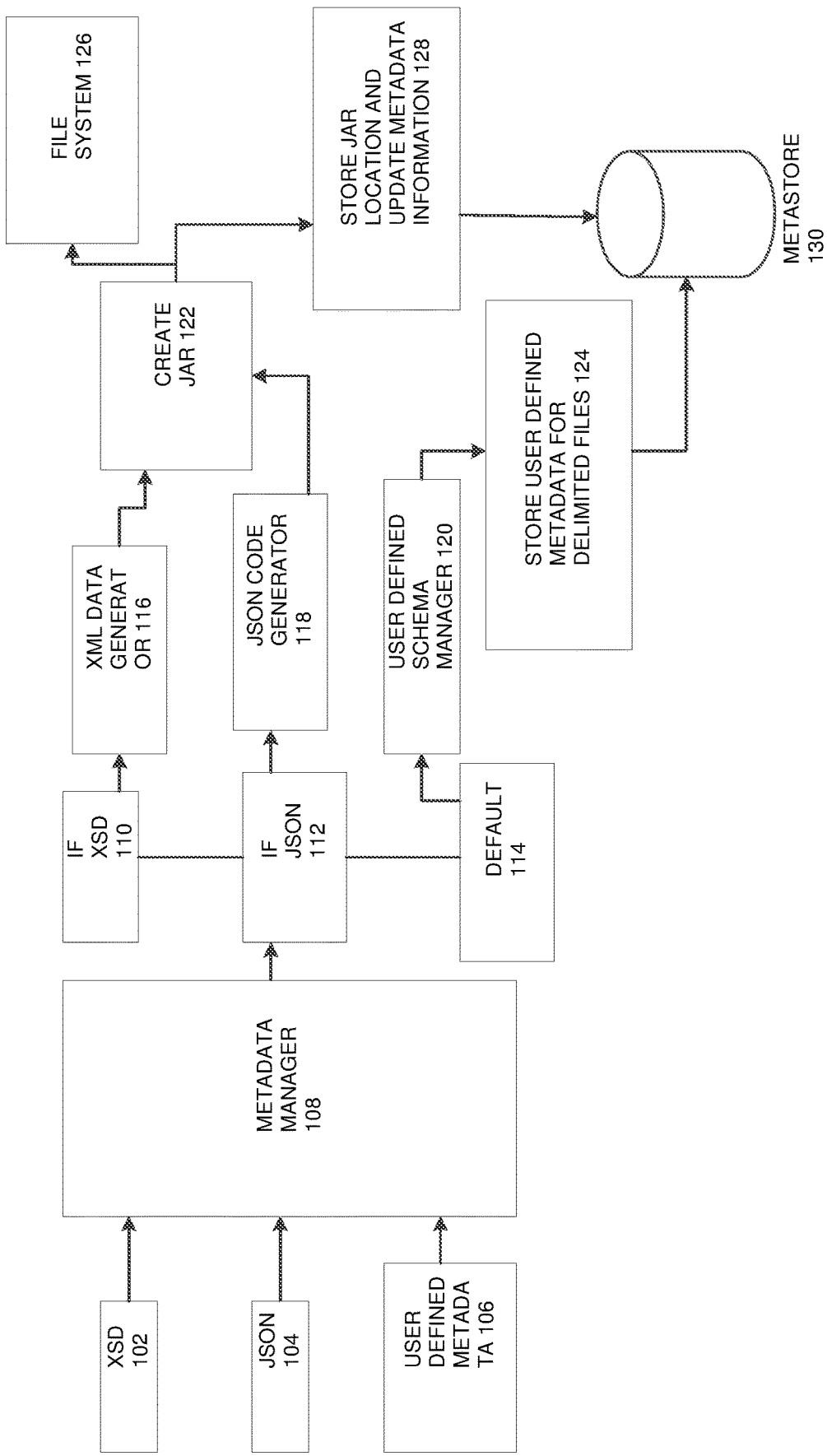
FIG. 1 is a diagrammatic representation of capturing metadata for semi-structured and delimited files, according to one or more embodiments.

FIG. 1 is a diagrammatic representation of capturing metadata for semi-structured and delimited files, according to one or more embodiments. Semi-structured data in multiple forms such as JSON 104, delimited files in the form of user defined metadata 106 and XML may be captured into an input pipeline. FIG. 1 shows capturing metadata from a user for semi-structured data such as XSD 102 in case of XML, sample data in case of JSON and schema information in case of delimited files. The XSD 102 may be used to generate run time code to parse incoming XML files. The run time code may be compiled and packaged as a library. Further, then library may be used during a run time for parsing incoming data such as XML files. The metastore 130 may maintain a catalog of incoming files and the library. In case of delimited files, schema information may be received as input from a user and/or auto generated and saved onto metastore 130.

The input pipeline may be directed onto a metadata manager 108. If XSD 110 maybe received as input, an XML generator 116 may create a JAR file 122. The JAR file may be stored onto a file system 126. The location information of the Jar file along with metadata information 128 may in turn be stored on the metastore 130.

In one or more embodiments, if JSON 112 is received, a JSON code generator 118 may create the JAR file 122. The JAR file may be stored onto the file system 126. The location information of the JAR file along with metadata information 128 may in turn be stored on the metastore 130. By default 114, the input pipeline data may be directed to a user defined schema manager 120 (For example, default scenario may be invoked in case of delimited files). The user defined meta for delimited files 124 may be stored in the metastore 130.

Figure 7:
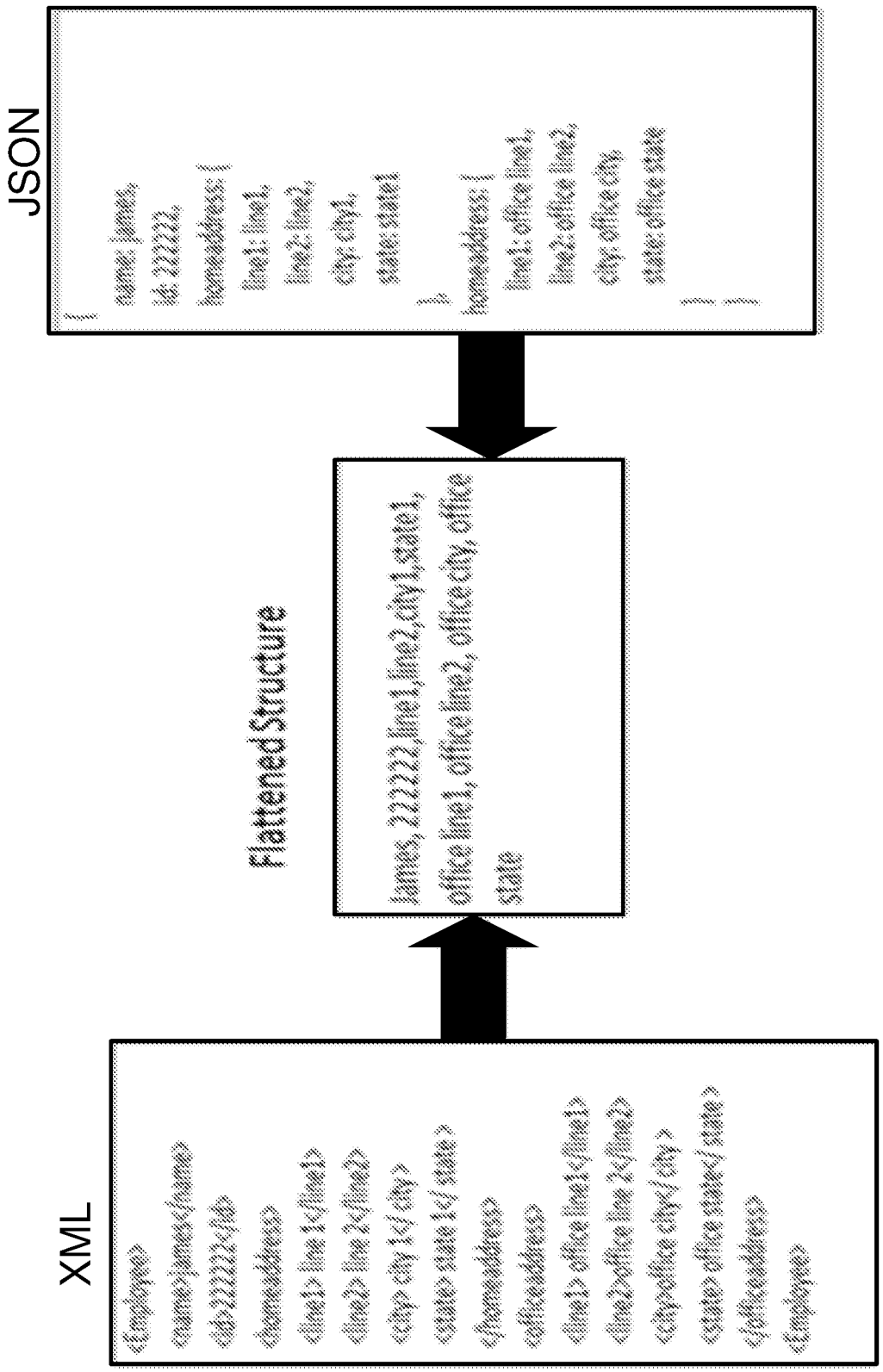
FIG. 7 is a diagrammatic representation of a creating a flattened structure from a JSON and XML input, according to one example embodiment.

FIG. 7 is a diagrammatic representation of a creating a flattened structure from a JSON and XML input, according to one example embodiment.

In one or more embodiments, incoming data files may be flattened. The incoming data files may be flattened to determine a type of incoming data file. The incoming data file may be matched against a metastore to locate a previously generated JAR file. Further, the incoming file may be parsed using a run time code generated. A delimited file may be created by flattening an incoming file such as JSN AND/XML. The flattened file may be stored in a distributed file system. The distributed file storage may be associated with a cloud storage mechanism.

In one or more embodiments, upon metadata setup and a library to process the data may be generated and an incoming file is parsed to create a delimited file.

In one or more embodiments, a Metadata definition of a final flattened output structure may be auto inferred from a XSD and/or sample input data. A definition may also be based on user-provided schema information.

In one or more embodiments, a data transformation layer may transform an input data into a flattened output based on input metadata and output metadata definitions.

In one or more embodiments, based on metadata information and transformation rules defined an unstructured data such as email, PDF etc., may be converted into flattened entity extracted data.

In one or more embodiments, based on metadata information and transformation rules defined a semi-structured data such as XML, JSON etc., may be converted into flattened data.

In one or more embodiments, a flattened entity extracted unstructured data, and flattened semi-structured data may be joined with structured relational data using the metadata and/or schema information captured.

Figure 8:
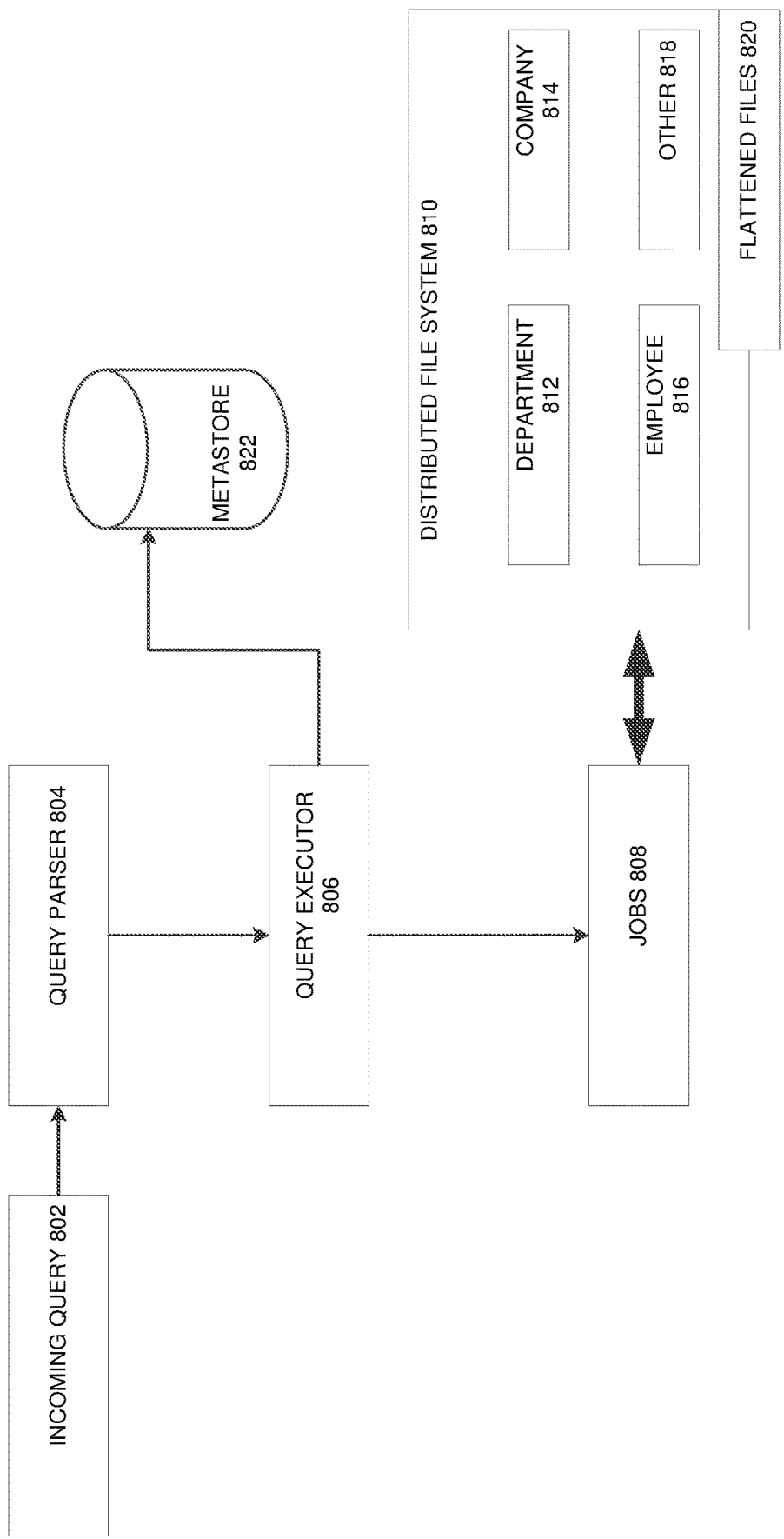
FIG. 8 is a diagrammatic representation of creating a uniform format, according to one or more embodiments.

FIG. 8 is a diagrammatic representation of creating a uniform format, according to one or more embodiments.

In one or more embodiments, flattened files may be used for data analytics. Data analytics may be performed using the big data processing tools. By creating a uniform format out of all varieties of data formats that may be received as input query 802, a query executor 806 may now create a unified view using jobs 808. The query executor 806 may receive data processed by a query parser 804 that receives the input query 802. The query executor may be communicatively coupled to a metastore 822. The jobs 808 may be communicatively coupled to a distributed file system 810.

In an example embodiment, "*" may be selected from employee 816, department 812, company 814 of an incoming query 802. The query executor 806 may identify files used in the incoming query 802 and map a metadata information stored in them metastore 822 to find flattened files 820. The query executor 806 may auto create jobs 808 such as a Spark and/or Hadoop Job to correlate data. The correlation of data may be based on a query plan.

the distributed file system 810 may include data such as department 812. Company 814, employee 816 and other data 818 that may be stored as flattened files 820 in the uniform format.

The jobs 808 may be based on Spark, Hadoop and/or Hive. Spark, Hadoop and Hive may be Apache™ (open source) based big data technologies.

In one or more embodiments, a method of extracting metadata information through a processor and further processing into a definite flattened structure from data source inputs (such as relational, structured, un-structured) is described. Further, the method may help in extracting an entity from multiple forms of data provided as input, through a processor based on the flattened structure. Still further, the method may join flattened semi-structured data and flattened entity extracted unstructured data with relational data, through a processor.

In an example embodiment, a metadata information of a semi-structured data source may is ingested into a data analytics (such as big data) system. The metadata information may be captured by a processor and a definition of the final flattened output structure may also be captured. Further, the metadata information may be transformed into the flattened output based on input metadata and output metadata options.

Advantages of the system include re-definition of a metadata for a flattened semi-structured data so that the semi-structured data may be joined with other flattened data sources and/or relational data sources. Disruptive data growth may led to several forms of data structures. Thus, it becomes imperative for systems to be agnostic to the data types and process input data to user queries generating insight from various forms of data such as Structured (i.e., relational data), Un-structured and/or Semi-structured.

For example, when the information processing involves data from social media and/or internet to be joined with relational master data a metadata of the unstructured information may be flattened with the corresponding metadata capture.

Further, highly distributed databases may be capable of managing simultaneous participation by billions of users, and highly distributed content management systems coordinating contributions of billions of users. Integrating the contributions of both people and machines, and spanning multiple organizations, firms, and the globe itself—may lead to complex data forms and variety of data. Further, making it tedious to make sense of the data. The methods and systems described herein may help derive meaning of the various forms of data. In one embodiment, where data is input in relational, unstructured, as well as structured forms, a processing engine may flatten the data to a form by joining multiple forms to derive analytics swiftly.

In one or more embodiments, a method may explicitly address the challenge of enabling "joining various forms of data" and also be capable of levels of scale, reliability, security and flexibility.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method comprising:
   capturing, through a processor, a meta data information associated with a semi-structured data and an unstructured data;
   defining, through the processor, a flattened structure for the semi-structured data and the unstructured data based on the captured meta data information;
   extracting from the unstructured data, through the processor, unstructured data associated with at least one entity;
   flattening, through the processor, the semi-structured data and the extracted unstructured data based on the flattened structure;
   joining, through the processor, the flattened semi-structured data and the flattened extracted unstructured data with relational data, wherein the joining creates joined flattened data;
   storing the joined flattened data in a file system;
   maintaining, through the processor, a metastore that stores the meta data information and location information of the joined flattened data in the file system;
   parsing, through the processor, an input query;
   identifying, through the processor, files used in the input query;
   mapping, through the processor, the meta data information stored in the metastore, and finding the joined flattened data in the file system; and
   querying, through the processor, the joined flattened data.

2. The method of claim 1, wherein the meta data information is captured from an incoming query.

3. The method of claim 1, further comprising:
   associating the flattened extracted unstructured data and the flattened semi-structured data to a data analytics mechanism.

4. A system comprising:
   a computer network;
   at least one processor; and
   at least one memory unit operatively coupled to the at least one processor over the computer network and having instructions stored thereon that, when executed by the at least one processor, cause the at least one processor to:
   capture, through the at least one processor, a meta data information associated with a semi-structured data and an unstructured data;
   define, through the at least one processor, a flattened structure for the semi-structured data and the unstructured data based on the meta data information;
   extract from the unstructured data, through the at least one processor, unstructured data associated with at least one entity;
   flatten, through the at least one processor, the semi-structured data and the extracted unstructured data based on the flattened structure;
   join, through the at least one processor, the flattened semi-structured data and the flattened extracted unstructured data with relational data, wherein the joining creates joined flattened data;
   store the joined flattened data in a distributed file system;
   maintain, through the at least one processor, a metastore that stores the meta data information and location information of the joined flattened data in the distributed file system;
   parse, through the at least one processor, an input query;
   identify, through the at least one processor, files used in the input query;
   map, through the at least one processor, the meta data information stored in the metastore, and find the joined flattened data in the distributed file system; and
   query, through the at least one processor, the joined flattened data.

5. The system of claim 4, wherein the meta data information is captured from an incoming query.

6. The system of claim 4, wherein the instructions further comprise instructions that, when executed by the at least one processor, cause the at least one processor to:
   associate, through the at least one processor, the flattened extracted unstructured data and the flattened semi-structured data to a data analytics mechanism.

7. A method of a data join comprising:
   capturing, through a processor, a meta data information associated with at least one of a semi-structured data and an unstructured data provided by a user, wherein the captured meta data information is used to generate run time code for parsing incoming XML files, wherein the generated run time code is compiled and packaged as a library;
   defining, through a processor, a flattened structure for the semi-structured data and the unstructured data based on transformation rules and the meta data information;
   extracting from the unstructured data, through a processor, unstructured data associated with at least one entity;
   flattening, through a processor, the semi-structured data and the extracted unstructured data based on the flattened structure;
   joining, through a processor, the flattened semi-structured data and the flattened extracted unstructured data with relational data, wherein the joining creates joined flattened data;
   creating, through a processor, a uniform format based on the joined flattened data;
   storing, through the processor, the joined flattened data in the uniform format in a file system; and
   maintaining, through the processor, a metastore that stores the meta data information and location information of the joined flattened data in the file system.

8. The method of claim 7, wherein the uniform format is an input to a data analytics mechanism.

9. The method of claim 7, wherein the meta data information is captured from an incoming query.

10. The method of claim 1, wherein the querying comprises automatically creating a job correlating data in the joined flattened data based on a query plan.

11. The system of claim 4, wherein the querying comprises automatically creating a Spark and/or Hadoop job correlating data in the joined flattened data based on a query plan.

12. The method of claim 1, wherein the joined flattened data is stored as a delimited file in the file system.

13. The method of claim 1, wherein the defining of the flattened structure is further based on transformation rules.

14. The method of claim 1, wherein the flattened structure is defined through a definition engine that has access to flattened structure templates.

15. The system of claim 4, wherein the joined flattened data is stored as a delimited file in the distributed file system.

16. The method of claim 7, wherein the metastore further comprises the library and a catalog of incoming files.

\* \* \* \* \*